May 14, 1963  E. A. WILKENSON  3,090,043
METHOD AND MEANS FOR INTERPRETING RADAR PRESENTATIONS
Filed Oct. 8, 1957  6 Sheets-Sheet 1
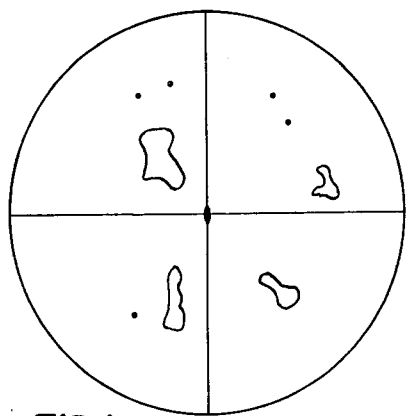
FIG.1 RADAR PRESENTATION FIRST MOMENT
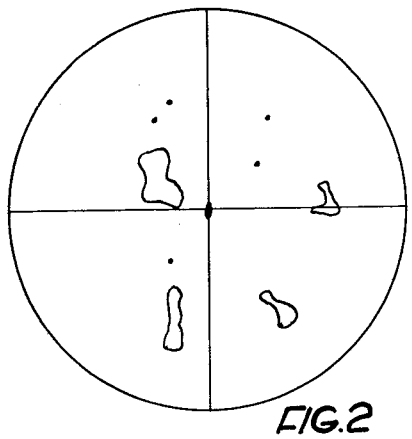
FIG.2 RADAR PRESENTATION SECOND MOMENT
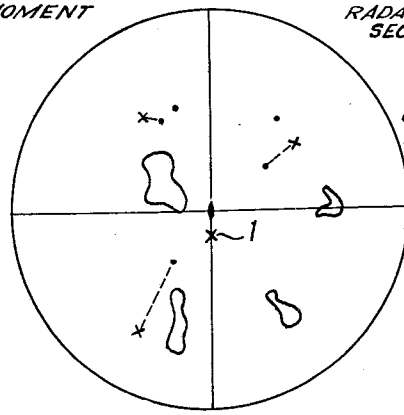
FIG.3   COMPARISON OF FIRST AND SECOND PRESENTATIONS TO SHOW MOTION OF OBJECTS
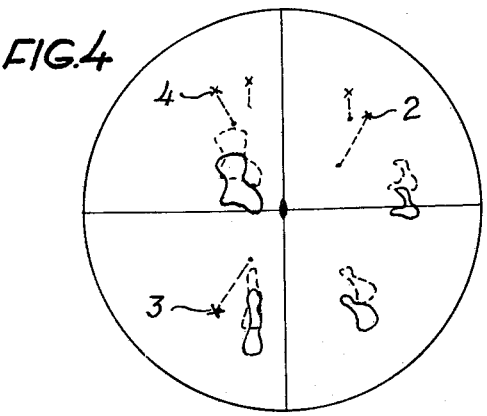
FIG.4   COMPARISON TO SHOW RELATIVE COURSES
Erik Alvar Wilkenson

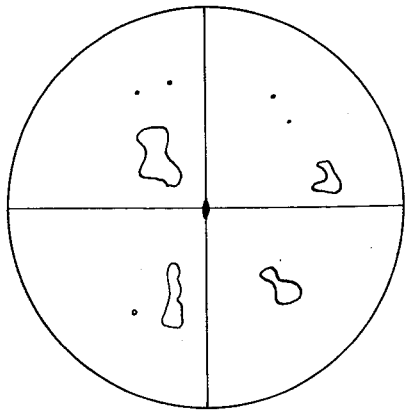
FIG.5 FIRST MOMENT
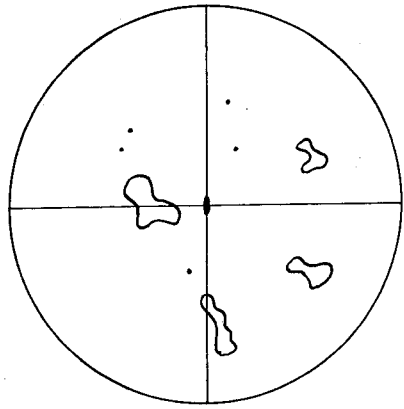
FIG.6 SECOND MOMENT
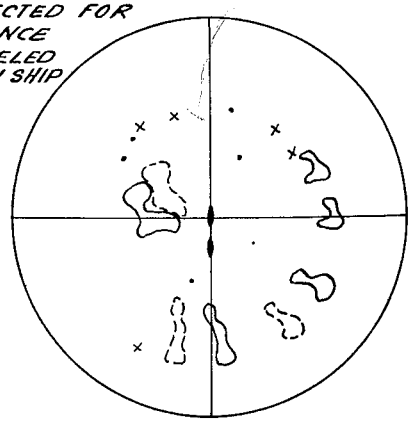
FIG.7 COMPARISON CORRECTED FOR DISTANCE TRAVELED BY OWN SHIP
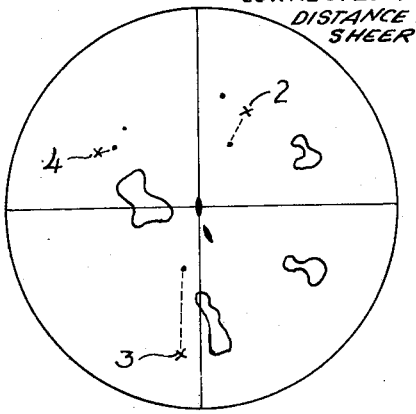
FIG.8 COMPARISON CORRECTED FOR DISTANCE AND SHEER

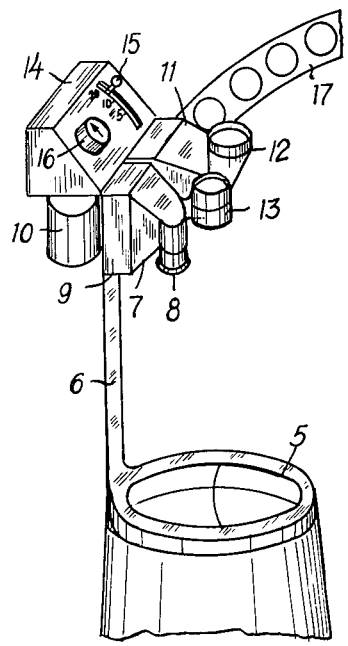
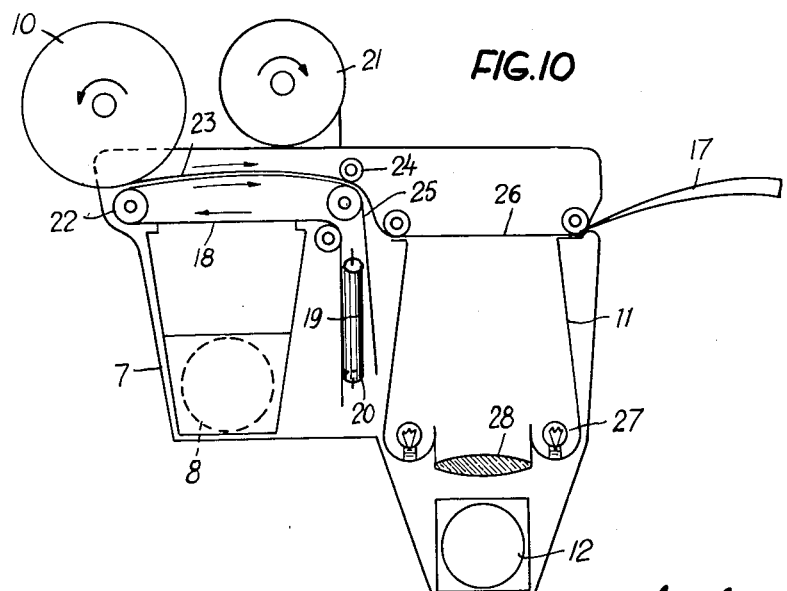

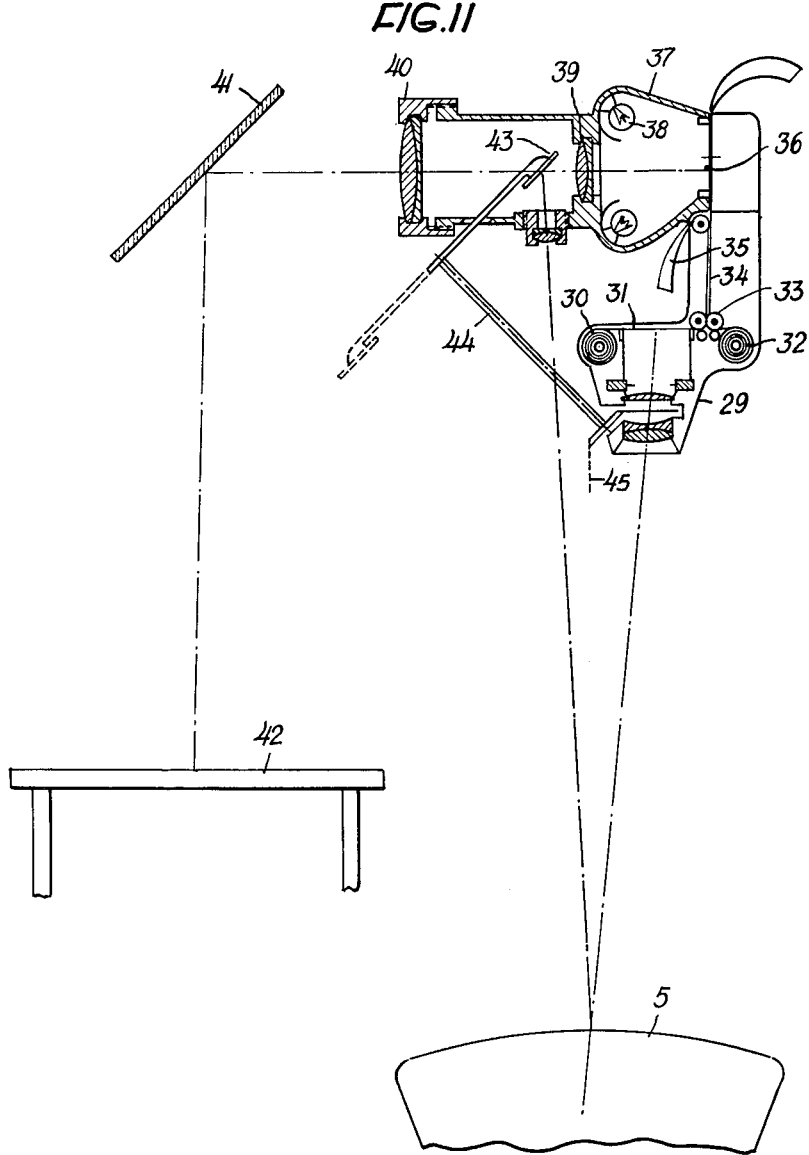

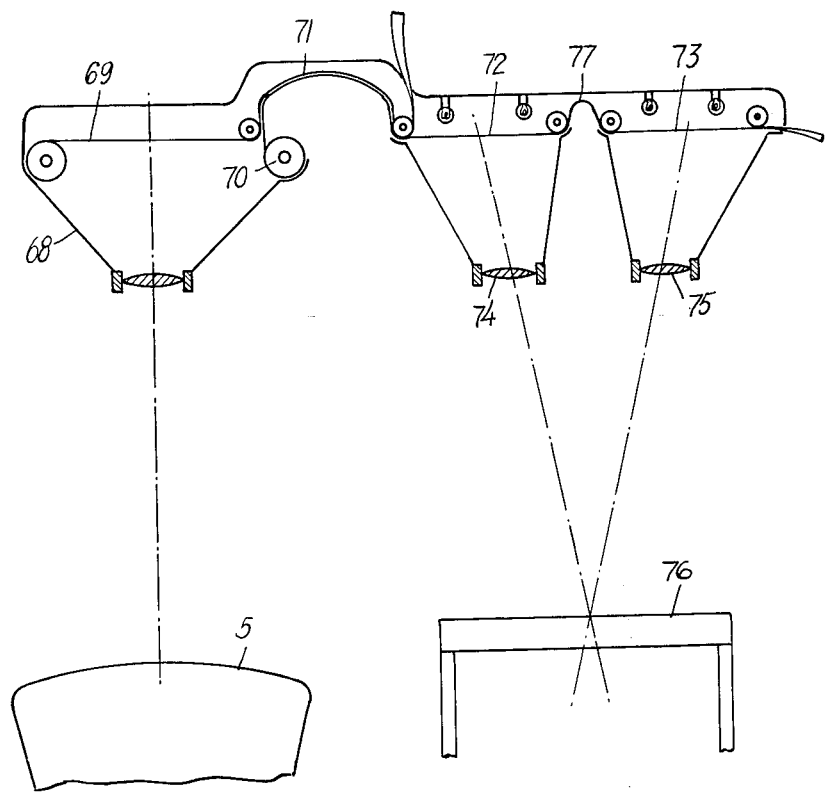

3,090,043
METHOD AND MEANS FOR INTERPRETING RADAR PRESENTATIONS
Erik A. Wilkenson, Platensgatan 7, Linkoping, Sweden
Filed Oct. 8, 1957, Ser. No. 688,847
Claims priority, application Sweden Oct. 11, 1956
3 Claims. (Cl. 343—11)

The present invention refers to an arrangement for interpreting indications on a radar screen, especially in ships or the like, wherein fixed or movable objects within the range of the radar apparatus are presented as light spots on the radar screen, generally called a plan position indicator (PPI). The presentation on the radar screen changes constantly partly on account of the ship's own movement and partly on account of the displacement of movable objects, if any. To establish the course and speed of such movable objects, a manual graphic method, so-called plotting, is employed for the recording of the movement of the objects. This method consequently calls for constant supervision by one man but still does not give absolute certainty because the radar indications of moving objects that might prove of interest later on always appear, initially, as fixed points on the PPI screen as well as on the plot. A further drawback with the radar presentation is that it cannot very well be studied in full daylight, inasmuch as weak indications might then be overlooked. On the other hand, it is desirable that the navigating officer be able to compare direct observations of a water-way with the radar presentation and with the chart, which is not possible with present equipment.

The arrangement according to the present invention consists of an apparatus for producing a positive photographic picture of the radar screen, an optical contrivance for superposing at least two real or virtual pictures of the radar screen, of which pictures one may be the actual radar screen presentation, an automatic device for conveying the film from the camera to the apparatus for producing the positive pictures and thence to the optical superposing contrivance. Said arrangement is substantially distinguished by a device which is adjustable for different speeds of the ship including zero, and is adapted to displace the superposed pictures relative to one another by a distance corresponding to the adjusted speed multiplied by the time interval between the pictures under consideration.

Figure 13:
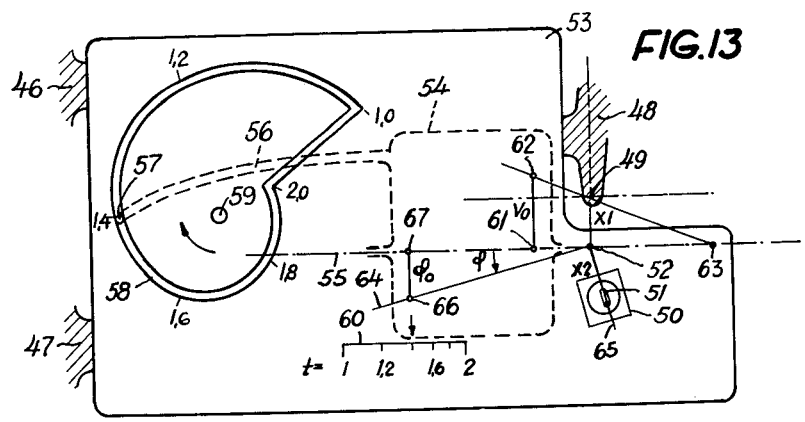
Figure 14:
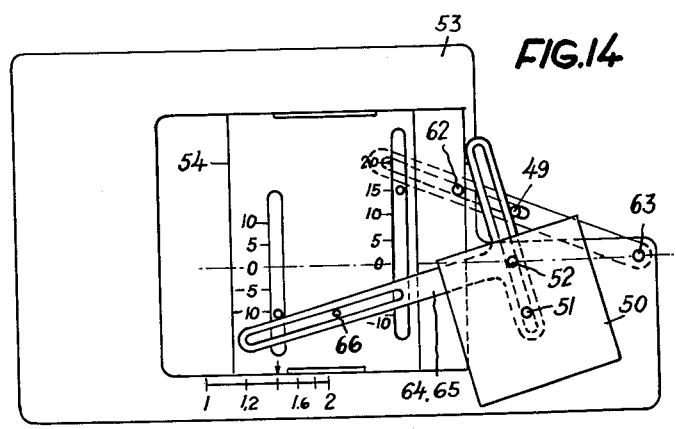
Figure 12:
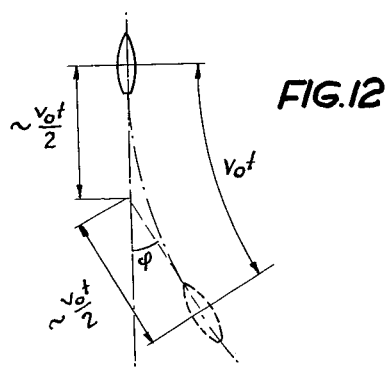

The invention will be described more particularly hereinafter in connection with the drawings, wherein FIG. 1 shows an example of indications on a PPI screen; FIG. 2 shows corresponding indications a short time later; FIG. 3 shows these two pictures after they have been optically adjusted to bring those parts that correspond to fixed objects in the picture field into coincidence; FIG. 4 shows the pictures according to FIGS. 1 and 2 when laid directly on top of each other. FIG. 5 is a repetition of FIG. 1, and FIG. 6 shows the same indications some time later on, after an interval during which the proper ship has altered its course. FIG. 7 shows the last two pictures when superposed and displaced relative to one another only with respect to the distance covered by the proper ship but not with respect to the alteration of its course. FIG. 8 shows the two pictures when superposed after relative displacement with respect to the distance covered by the proper ship and also with respect to the alteration of its course. FIG. 9 shows an embodiment of the invention wherein the radar presentation is recorded by a camera and the photographic picture is compared optically with the actual radar presentation a short time later. FIG. 10 shows diagrammatically how the camera in question, the developing apparatus and the optical comparison apparatus are arranged. FIG. 11 shows another embodiment of the invention, where the photographic picture is projected on a board for comparison with charts and also on the radar screen for comparison with the actual presentation. FIG. 12 shows the geometric relation between the displacement and the total change of course of the ship. FIGS. 13 and 14 show a contrivance according to the invention to bring about the continuing translation and rotation, if any, which the photographic picture must be subjected to for direct comparison with the actual radar presentation. Finally, FIG. 15 shows a third embodiment of the invention, wherein transparent diapositives are produced photographically and two of them are projected on a board for comparison with one another and with charts.

FIG. 1 shows an example of indications on a plan position indicator (PPI), wherein the irregular fields refer to terrain lines such as isles, and the different points refer to smaller objects. The proper ship is at the center; the diameters drawn in are merely reference lines. A short time afterwards the corresponding indications will have altered as set forth in FIG. 2. We are thus called upon to interpret the change of the radar presentation, so that the course and the speed of movable objects are determined within the field of view relatively to the ship as well as relative to fixed objects. FIG. 3 shows how the two pictures may be superposed on each other, so that all those parts that correspond to fixed objects in the field of view are caused to coincide. This is attained, if the first picture (according to FIG. 1) is displaced by a distance corresponding to the distance covered by the ship. The previous picture is thus laid with its center at 1 in FIG. 3. Then all indications originating in fixed objects coincide, but at the points marked with crosses in FIG. 3 the pictures do not coincide. These consequently correspond to all movable objects in the field of view. Now, these movable objects may be marked in different ways, for instance by the fact that the two superposed pictures are now shown in different colours, which for fixed objects are blended to a certain colour tone, whereas they appear with the different colours separated for the movable objects. Effective marking may also be brought about by arranging the two pictures in an optical comparison device so that they are alternately illuminated periodically. The fixed objects are then viewed in a steady light, whereas the movable objects appear to change their positions periodically. In FIG. 3, the changing indications have thus been connected with dash lines. These lines represent the course of the objects and with respect to their length also designate their speed relative to fixed objects. All of the movable objects in FIG. 3 thus approach the ship and intersect its course. The question is now whether any one of the objects may involve a risk for navigation. To decide this question one may, according to the invention, momentarily eliminate the displacement between the two superposed pictures, so that the proper ship remains at the center, see FIG. 4. All indications are then marked as being movable relatively to the proper ship. If the marks for the three movable objects are now examined it will be found that the object 2 intersects the course of the proper ship astern; on the other hand, the relative courses for the objects 3 and 4 point straight to the proper ship, for which reason a risk may be incurred.

The method described above is characteristic of the present invention, which makes possible the quick and exact interpretation of the radar pictures by first adjusting the comparison pictures to a displacement such that all fixed objects appear alike, after which this displacement is removed, so that the course of the movable objects relatively to the ship can be studied directly.

If the proper ship not only advances but also alters its course, two radar pictures will appear as in FIGS. 5 and 6. If these are superposed but are displaced relative to one another only in relation to the advancement of the ship, the composite picture will appear as in FIG. 7. However, if the first picture is also turned in agreement with the total alteration of the course during the time interval, then FIG. 8 presents itself, where all movable objects appear clearly. To judge the risk of collision with these three movable objects, it is necessary to study the picture according to FIG. 8 and then decide whether one should continue the sheer or not. Obviously, the risk of collision with object 2 has increased, but that risk is eliminated as to object 3, while it cannot be definitely determined with respect to object 4. It is therefore possible to steer straight ahead for a moment and then to study the relative positions according to the description in connection with FIGS. 1–4.

In the embodiment of the invention shown in FIG. 9, 5 designates the radar screen, 6 a support for a camera and a comparison apparatus, 7 the camera with its objective 8 directed to the radar screen, 9 a developing and copying apparatus, 10 a magazine for copying paper, 11 an optical viewing appaartus for the photographs, 12 an ocular for this viewing apparatus, 13 an ocular for direct observation of the radar presentation, 14 an apparatus for automatic adjustment of the comparison picture to make it coincide with the radar presentation in dependence on the adjustment of a control 15 which is set in accordance with the speed of the ship and of a control 16 which is set in accordance with the sheering rate of the ship. Finally, 17 denotes the resulting film band, which may have a value as a documentation of observations and manoeuvres made. To enable the observer to differentiate between the two images being observed—i.e., the radar presentation and a picture of an earlier presentation, the oculars 12 and 13 may be provided with suitable colour filters or with synchronously operating diaphragm devices, so that the images appear alternately at a frequency which is high enough to permit the eye to follow and equalize the different positions of the indications, while being low enough to give a flickering effect; a frequency between 2 and 16 cycles per second is approximately suitable.

FIG. 10 elucidates how the apparatus shown in FIG. 9 is built and operates. In the camera 7, the objective 8 reproduces the radar screen on the film at 18 via a mirror. This film is fed to the camera from the outside at 19 via a pulley 20, so that the camera may be fed with film from a large magazine 21. From a magazine 10, printing paper is brought together with the exposed film at the roll 22, where developing and printing chemicals are also supplied. At 23 a positive picture is produced directly, for instance according to the known method Land-Polaroid. At the rolls 24, the negative 25 is separated and the positive picture is advanced further to the position 26 in the viewing apparatus. The lamps 27 illuminate the picture, which is viewed via the ocular 12 and the lense 28. This optical system is adjusted so that the photographic picture appears as lying in the same plane and having the same picture scale as that of the radar presentation at 5. By means of an automatic device, not shown, the film is advanced periodically in a stepwise fashion adapted to the requisite developing time. Without calling for continuous attendance the apparatus is thus always ready for observing the pictures. Here, the control 15 is adjusted in accordance with the speed of the ship, and if desired the sheering rate control 16 is turned in accordance with the sheering speed of the ship. In the oculars 12 and 13, the pictures then appear as being alike regarding fixed objects, whereas movable objects are indicated in different colours or as flickering. If a sheer has not occurred, the course of the movable objects relatively to the ship can be established at once by the proper setting of the control 15.

While the apparatus described gives a virtual picture at the radar screen of the photographic picture of the screen at an earlier moment, the embodiment shown in FIG. 11 gives a real picture of the photograph at the radar screen. In the camera 29, film is fed in from the magazine 30 to the film position 31, where the radar screen is reproduced by the objective. From the magazine at 32, positive paper is brought together with the negative at the rolls 33, where developing agents are also supplied. Upon development at 34, the negative is separated at 35, and the positive picture is moved to the position 36 in the projector 37. The lamps 38 illuminate the picture, which is projected by the lenses 39 and 40 via the mirror 41 to the board 42. The enlargement is then adapted so that the picture will present the same scale as that of the chart employed, wherein the chart and the radar picture may thus be compared on the board. If found desirable, the board may be provided with a chart holder, which is movable in correspondence to the movement of the ship. However, the picture is also projected to the radar screen for comparison with the latter. This is effected by a mirror 43, which is mounted on a rotating axle 44. Located on this axle is also a diaphragm 45 for the camera objective in a position such that when the camera is entirely screened off, the mirror will be found in operative position to throw the projection picture down onto the radar screen; immediately thereafter, the mirror leaves the pencil of projection rays, and the passage of rays from the radar screen to the camera is permitted. This prevents the camera from photographing the optically projected picture. To facilitate the comparative examination of the pictures in the radar screen, the latter may preferably be coloured differently.

The figure does not disclose the controlling means and mechanisms required to bring about the desired displacement and/or turning of the comparison picture relatively to the radar presentation. This may be conceived of as taking place in a similar manner to the apparatus according to FIG. 9 with respect to the possible movement of the board 42.

In connection with the embodiment described with reference to FIG. 11, it may be advantageous to use such positive material as produces diapositive pictures directly. The lamps 37 would then of course be located on the right of the picture frame 36. The advantage of this lies in an increased light intensity of the picture at 42.

The requisite displacement and turning of the photographic picture for comparison with the actual radar presentation must increase according as the "age" of the picture increases. According to FIG. 12, a speed $v_0$ of the ship brings about a displacement $v_0 t$ of the ship during a time interval of $t$ between the comparison photograph and the actual radar presentation, where $t$ is the running time. With a simultaneous sheer through a total angle $\varphi$, the path may be given approximately by means of a circular arc according to the figure. With good accuracy, the desired correction is obtained in different directions by conceiving the path of the ship as consisting of two recti-linear parts in the figure. This may be reproduced by means of a mechanism according to FIGS. 13 and 14.

In FIG. 13, the abutments 46, 47 and 48 constitute fixed parts in a viewing apparatus like that of FIG. 10 or a projector like that of FIG. 11. Point 49 constitutes the optical center of the picture surface, while the square 50 represents a board on which the picture is carried with its center at point 51. The distance from 49 to point 52 is denoted by $x_1$ and the distance between 52 and 51 is designated by $x_2$. These two distances correspond to the distances $$\frac{v_0 t}{2}$$

in FIG. 12. Point 52 is located on the plate 53, which is movable in the vertical direction of the paper between the fixed abutments 46, 47 and 48. This movement is effected in the following manner. The plate 54 represented with dash lines is movable in a lateral direction and is guided by a line-shaped guide 55. The arm 56 from the plate ends in a button 57, which is in engagement with a curved groove 58. This curved groove is turned round the axis 59 on the plate 53 at a constant speed, and the curve is shaped so that the position of the plate 54 in a lateral direction becomes the desired function of time which is readable at the scale 60. Provided on the plate 54 is the control by means of which the speed $v_0$ of the ship is adjusted as a distance between 61 and 62. From the upper point 62 of the latter to the point 63 on the plate 53 extends a rod which is also guided at the point 49. By the fact that the distance 61—63 of the curve 58 is kept inversely proportional to the time $t$, and the distance 52—63 constitutes half a unit in the same scale, $x_1$ becomes equal to $$\frac{v_0 t}{2}$$

as desired. By means of a mechanism not shown, $x_2$ is made equal to $x_1$. Hereby the desired displacement is reproduced corresponding to the advancement of the ship. In case there is a change of the course correction is made in the following manner. Rotatably mounted at point 52 on the plate 53 is an angular arm 64—65, which carries the board 50 and is guided by the pin 66, which is adjustable on the plate 54, so that the distance 66—67 corresponds to the sheering rate of the ship, that is to say the change of the course per unit of time. By the fact that the distance 61—67 is half a unit, the distance 52—67 becomes inversely proportional to the time, and thus the angle 67—52—66 becomes exactly the total of the change of the course during the time $t$. The point 51 thus obtains the desired position with respect to both the longitudinal movement and the sheering of the ship.

FIG. 14 shows how the diagrammatically shown elements in FIG. 13 may be carried out by means of slides and rods. The designations are the same as for the corresponding elements in FIG. 13, for which reason a more detailed description appears to be unnecessary.

The provision of the adjusting means described with reference to FIGS. 13 and 14 makes it unnecessary continuously to adjust for the distance covered and the sheer from the point where the comparison photograph was exposed, only the actual average speed or the average sheering speed being adjusted, whereupon the apparatus keeps the pictures in agreement continuously. In connection with changing from one photograph to the next, quick adjustment is effected by the abrupt change of the curve 58 between the figures 2.0 and 1.0, and the apparatus consequently sets itself for each successive picture. The turning of the curve 58 is preferably coupled to the same clockwork or motor that takes care of the automatic periodical exposure of the film and the conveyance of the negative and positive material in the apparatus.

Although agreement as to the position between the photographed comparison picture and the actual radar presentation is thus ensured by the means described, there is still a difference in the appearance of these pictures, which renders the comparison difficult; this results from the fact that the radar picture does not have a constant light intensity but will gleam up in its different parts, according as the antenna sweeps over the target range. After rather a short illuminating time the individual indications darken again. In order that the camera shall record all indications round the whole sweeping range of the antenna, the exposure must be extended over a complete sweeping cycle. In observing the two comparison pictures in the above described apparatus there is thus available a photograph with a constant light intensity to compare with a locally periodically gleaming radar picture. This may be considered to contribute to the accuracy of the comparison examination by reason of the fact that a previous warning is provided by the photographic picture where a radar indication may be expected. On the other hand, it may be desirable to give the optical comparison picture the same character as that of the radar picture. To this end the viewing apparatus or the projector may be provided with a filter which is rotatively arranged in front of the photographic positive picture and is turned synchronously with the sweeping of the target range by the antenna, the filter being so formed as to bring about a local change of the light intensity of the photographic comparison picture which is similar to that of the radar picture.

A considerable simplification may be obtained in the embodiment of the invention which is described diagrammatically in FIG. 15. The radar screen is photographed by the camera 68 on a film surface at 69. Diapositive material from the supply is brought together with the negative at 71, a diapositive picture being thus produced. The latter is moved further to the positions 72 and 73 where they are scanned and projected by the lenses 74 and 75 onto the board 76. With this construction of the apparatus the actual radar presentation cannot be compared with any photographic picture through direct superposition, but the comparative study of the pictures takes place between two photographic exposures. The apparatus becomes much simpler, however, inasmuch as the displacement and/or rotation of the pictures relative to one another need not be made varying with the running time but becomes constant, and is merely directly proportional to the adjusted average speed or sheering speed. The loop of the diapositive strip marked at 77 is arranged to permit the requisite displacement or turning movement. This loop may also be made larger to accommodate an intervening portion of the picture band when it is desired to compare two pictures with more than one simple time interval therebetween. Otherwise, this figure is highly simplified; thus it does not contain any means to facilitate the comparative examination of the two pictures.

Obviously, the invention is not limited to the embodiments described above; other constructions being also conceivable within the scope of the claims.

What I claim is:

1. The method of utilizing substantially instantaneous presentations appearing on the screen of a PPI type radar device on which the position of a movable observing vehicle carrying the device is represented by a point that maintains a fixed position on the screen, to determine the courses and distances traversed during a predetermined time interval by the observing vehicle and other movable objects, relative to one another and to fixed objects, which method is characterized by the steps of: periodically, at regular intervals, making a facsimile record of presentations appearing on the screen; and superimposing upon a display of a current presentation appearing on the screen a facsimile of an earlier recorded presentation, said display and said facsimile being to the same scale, and said point on the facsimile being spaced from said point on the displayed current presentation by a distance proportional to the distance traveled by the observing vehicle during the interval between the presentation of said earlier recorded presentation and the current presentation and in a direction relative to the displayed current presentation which is opposite to that which corresponds to the direction of travel of the observing vehicle during said interval, and with said facsimile rotated relative to the displayed current presentation through an angle equal to but opposite from the total angle through which the observing vehicle sheered during said interval.

2. Means utilizing substantially instantaneous presentations appearing on the screen of a PPI type radar device on which the position of a movable observing vehicle carrying the device is represented by a point that maintains a fixed position on the screen, to depict a representation of the courses and distances traversed during a predetermined time interval by the observing vehicle and other movable objects, relative to one another and to fixed objects, said means comprising: means for periodically, at regular intervals, making a facsimile record of presentations appearing on the screen; means for displaying at a fixed location the presentations appearing on the screen, contemporaneously with their appearance on the screen; means for displaying at said location a facsimile record of an earlier presentation, to the same scale as the displayed contemporary presentation; means for translating the display of the facsimile to enable said point thereon to be located at a distance from said point on the displayed contemporary presentation which is proportional to the distance traveled by the observing vehicle during the interval between presentation of said earlier recorded presentation and the contemporary presentation and in a direction from said point on the displayed contemporary presentation which is opposite to that corresponding to the direction of travel of the observing vehicle during said interval; and means for rotating the facsimile, relative to the display of the contemporary presentation, through an angle equal to but opposite from the total angle through which the observing vehicle sheered during said interval.

3. Means utilizing substantially instantaneous presentations appearing on the screen of a PPI type radar device on which the position of a movable observing vehicle carrying the device is represented by a point that maintains a fixed position on the screen, to depict a representation of the courses and distances traversed during a predetermined time interval by the observing vehicle and other movable objects, relative to one another and to fixed objects, said means comprising: an automatic camera for making photographs on photographic film, at regular intervals, of presentations appearing on the radar screen; means for rapidly developing the photographic film exposed in said camera; means for displaying at a fixed location presentations appearing on the screen contemporaneously with their appearance thereon; means for displaying a developed photograph of an earlier presentation, made by said camera, in apparent substantially superposed relation to the display of the contemporary presentations; means for translating the display of the developed photograph to enable said point thereon to be located at an apparent distance from said point on the displayed contemporary presentation which is proportional to the distance traveled by the observing vehicle during the interval between the presentation of the earlier photographed presentation and the contemporary presentation and in a direction from said point on the displayed contemporary presentation which is opposite to that corresponding to the direction of travel of the observing vehicle during said interval; and means for rotating the display of the developed photograph, relative to the display of the contemporary presentation, through an angle equal to but opposite from the total angle through which the observing vehicle sheered during said interval.

References Cited in the file of this patent

UNITED STATES PATENTS

| | | |
|---|---|---|
| 2,410,424 | Brown | Nov. 5, 1946 |
| 2,508,562 | Bonner | May 23, 1950 |
| 2,581,358 | Busignies et al. | Jan. 8, 1952 |
| 2,586,743 | Thresher et al. | Feb. 19, 1952 |
| 2,586,772 | Ashby et al. | Feb. 26, 1952 |
| 2,668,286 | White | Feb. 2, 1954 |
| 2,701,352 | Kingdon | Feb. 1, 1955 |
| 2,724,099 | Harrison | Nov. 15, 1955 |
| 2,779,017 | Land et al. | Jan. 22, 1957 |

FOREIGN PATENTS

| | | |
|---|---|---|
| 591,856 | Great Britain | Sept. 1, 1947 |